Dec. 11, 1962     K. YANUSH     3,067,467
MOLDING APPARATUS
Filed Oct. 3, 1960     3 Sheets-Sheet 1
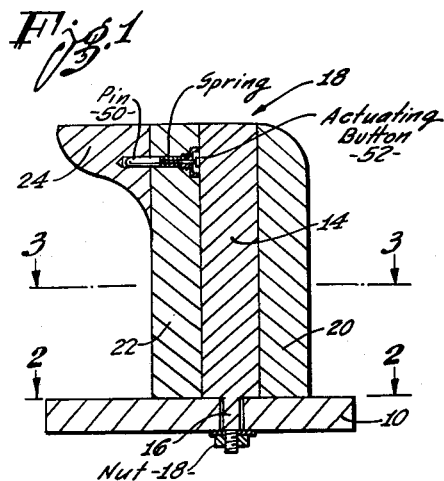
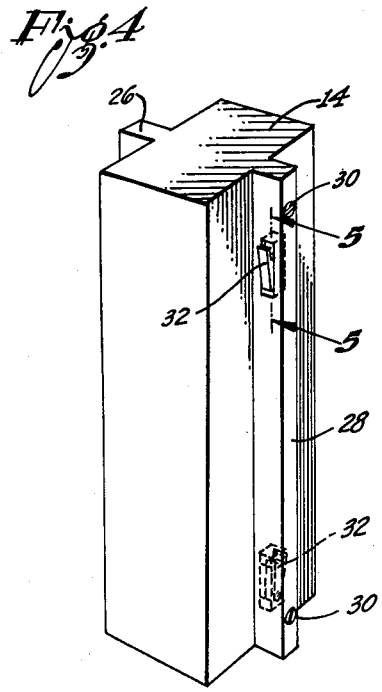
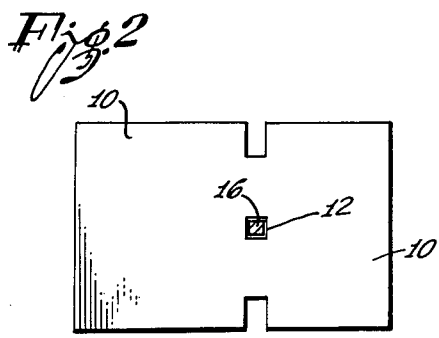
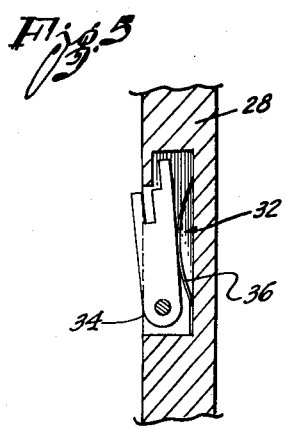
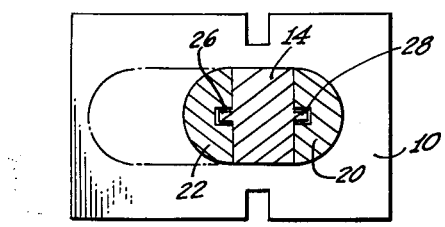
INVENTOR:
Konstant Yanush
By Keith D. Beecher
Attorney Dec. 11, 1962 K. YANUSH 3,067,467
MOLDING APPARATUS
Filed Oct. 3, 1960 3 Sheets-Sheet 2
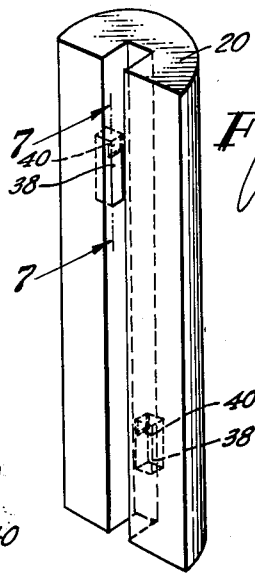
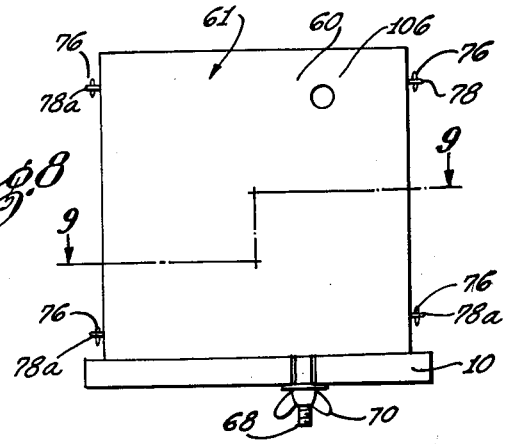
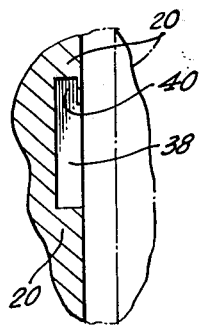
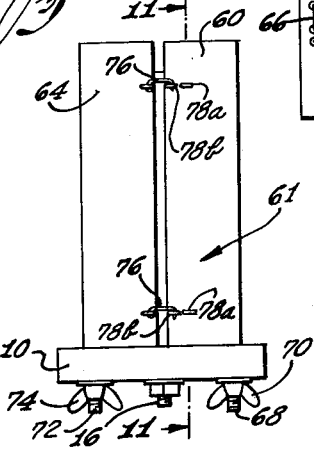
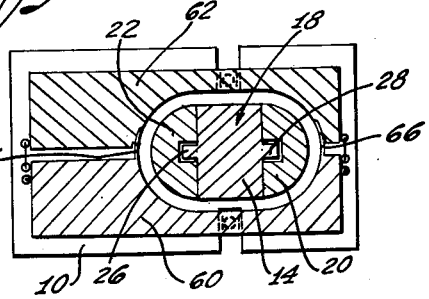
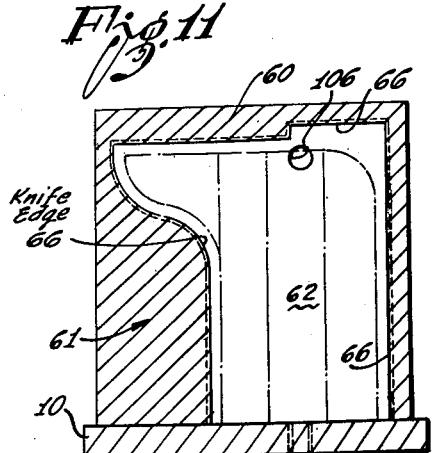
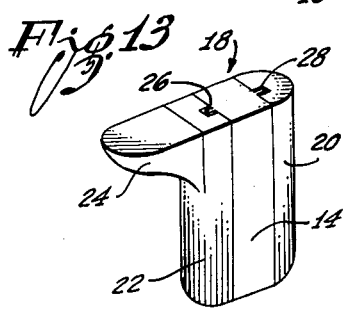
INVENTOR.
Konstant Yanush
By Keith D. Beecher
Attorney

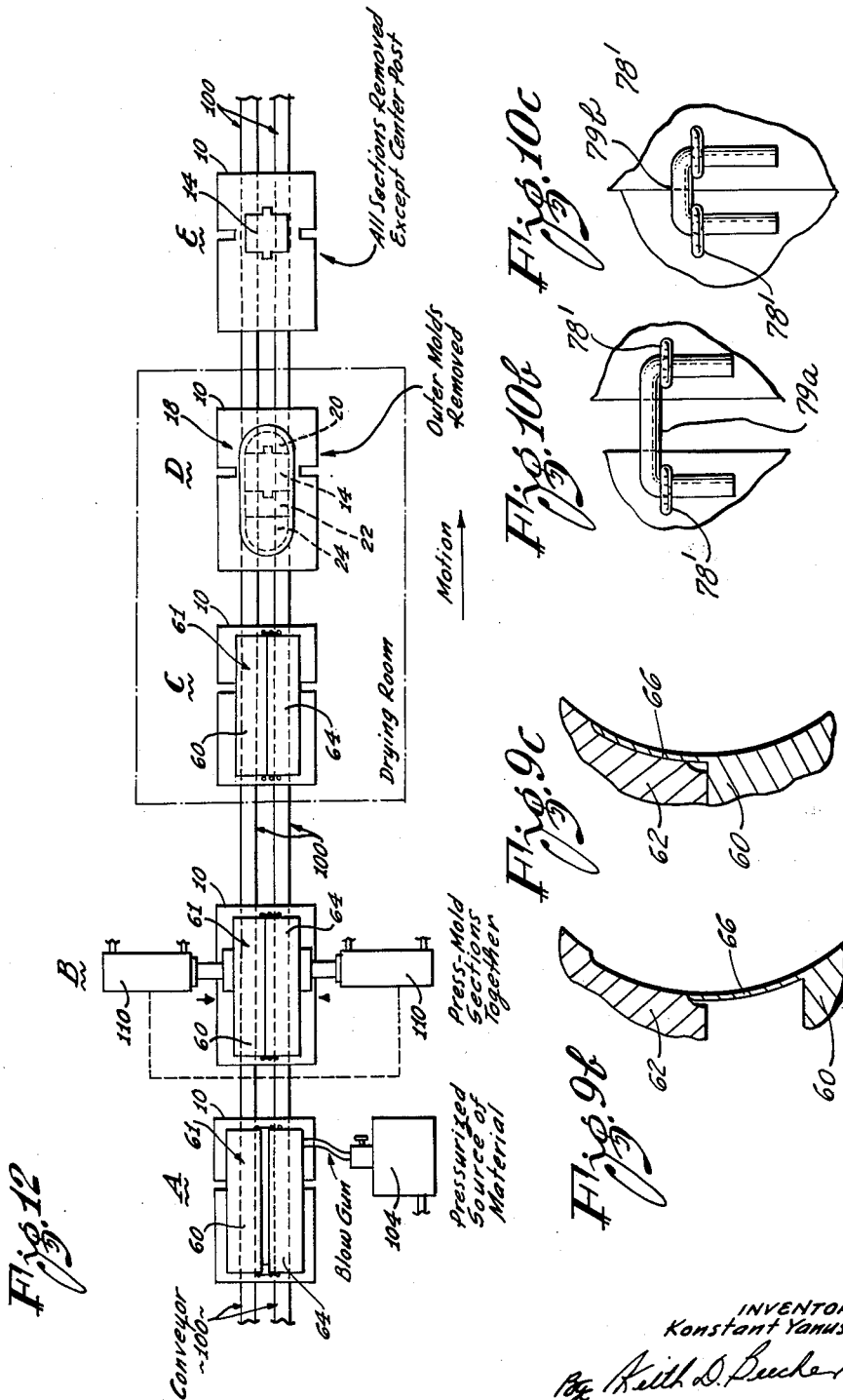

United States Patent Office 3,067,467
Patented Dec. 11, 1962

3,067,467
MOLDING APPARATUS
Konstant Yanush, 8722 E. Las Tunas Drive,
San Gabriel, Calif.
Filed Oct. 3, 1960, Ser. No. 60,091
4 Claims. (Cl. 18—34)

The present invention relates to a new and improved apparatus for making molded felt footwear.

The apparatus of the present invention is of the general type disclosed and claimed in copending application Serial No. 722,491, filed March 19, 1958, in the name of the present inventor, this application having now issued as Patent 2,975,480.

An important object of the invention is to provide a new, improved and simplified molding apparatus for making felt boots from a slurry of felt fibres; the apparatus of the invention being conceived and constructed to produce molded felt boots in a completely finished condition so as to preclude the need for time-consuming and expensive hand finishing operations.

Another object of the invention is to provide such an improved apparatus for making molded felt footwear in an inexpensive manner, and which apparatus lends itself to large scale mass production of felt boots and shoes.

Yet another object of the invention is to provide such an improved apparatus for making molded felt boots or shoes, which is capable of making the boots or shoes to any desired degree of hardness or softness; or of making different parts of any particular molded boot or shoe, such as the heels and soles, harder than the other parts.

The apparatus to be described includes in general three principal mold elements. These mold elements include an inner mandrel mold element, and two outer mold elements. All the mold elements are suitably mounted on a base plate or platform, so that they may be quickly and easily assembled and disassembled. The pedestal itself may be removably mounted on an appropriate conveyor system, so that the molded boots or shoes may be carried from one station to another during their fabrication process.

In accordance with an important feature of the invention, the two outer mold elements are constructed so that they may telescopically engage one another. Then, during the initial steps of the molding method or process, the outer mold elements are spaced from the inner mold element a distance greater than the final thickness of the shoe to be molded. The outer mold elements are subsequently forced together, after the slurry of felt particles has been introduced into the mold, and after the slurry has set to the desired boot configuration. This forcing together of the outer mold elements presses the felt particles together to produce a finished product that does not require any subsequent expensive and time-consuming hand finishing operations. Moreover, by the selected choice of pressure and time of the pressing operation, shoes of different degrees of hardness or softness can be made by the same molds.

In the embodiment of the invention to be described, the inner mandrel mold element is made up of front, central, and rear longitudinal portions, and of a toe portion releasably supported on the front portion. The central longitudinal portion of the inner mold element is fastened to the supporting platform or pedestal, and the front and rear longitudinal portions are slidably moved up and down with respect to the inner portion. When the molding operation is completed, the outer mold elements are opened, and the boot, together with the front and rear longitudinal sections of the inner mold element, and the toe portion of the inner mold element, are moved up off the pedestal. A convenient release button on the front longitudinal portion is provided, and this button can be actuated to release the toe portion. In this manner, the finished boot or shoe can be quickly removed from the molding assembly.

Other objects, features and advantages of the invention will become apparent from a consideration of the accompanying drawings in conjunction with the following description.

In the drawings:

FIGURE 1 is an elevational sectional view substantially on the line 3—3 of FIGURE 3 and showing the inner mandrel mold element and the various portions which make up that mold element, and also showing the manner in which the central portion of the inner mandrel mold element is mounted on a pedestal or platform:

FIGURE 2 is a top view, substantially on the line 2—2 of FIGURE 1, and showing the supporting platform of the mold of the present invention;

FIGURE 3 is a sectional view, substantially on the line 3—3 of FIGURE 1, and showing the longitudinal portion of the inner mandrel mold element;

FIGURE 4 is a perspective view of the central portion of the inner mandrel mold element and illustrating particularly the manner in which the elongated guide elements are mounted on that portion to engage channels in the front and rear portions of the inner mold element;

FIGURE 5 is a fragmentary view substantially on the line 5—5 of FIGURE 4 and illustrating the construction of certain locker members included in the elongated members on the central portion of the inner mold element;

FIGURE 6 is a perspective view of the rear portion of the inner mold element, this view particularly illustrating the longitudinal channel in that portion for receiving the elongated member of the central portion of the inner mold element;

FIGURE 7 is a fragmentary sectional view, taken substantially on the line 7—7 of FIGURE 6, and illustrating the configuration of certain cavities and pockets which are formed in the side walls of the channel in the rear mold portion of FIGURE 6, and which are also formed in the channel of the front mold portion;

FIGURE 8 is a side elevational view of the mold of the present invention, particularly illustrating one of the two outer mold elements and the manner in which it is supported on the supporting platform;

FIGURE 9A is a cross-sectional view, substantially on the line 9—9 of FIGURE 8, and illustrating particularly the relationship between the inner and outer mold elements of the mold of the invention, and the manner in which the outer mold elements are constructed to permit a telescopic engagement thereof at their parting line;

FIGURES 9B and 9C are fragmentary cross-sectional views, similar to FIGURE 9A, but on an enlarged scale;

FIGURE 10A is a side elevational view of the mold of the present invention, the view of FIGURE 10 being turned 90 degrees with the view of FIGURE 8 to reveal the parting line of the outer mold elements and the latching means which are used to hold the outer mold elements together;

FIGURES 10B and 10C are fragmentary views, similar to FIGURE 10A and showing a modified latching means for the outer mold elements;

FIGURE 11 is an elevational sectional view, taken substantially on the line 11—11 of FIGURE 10A, and revealing the inner cavity of one of the outer mold elements;

FIGURE 12 is a schematic representation of a series of molds, constructed in accordance with the present invention and mounted on a conveyor, the molds being carried by the conveyor from one station to another to permit appropriate operations to be made, as will be described; and FIGURE 13 is a perspective view of the inner mandrel mold.

In the usual prior art apparatus for the manufacture of molded felt boots, and the like, it was the normal practice, after the mold had been filled with the slurry of felt particles, for the mold to be placed in a drying room. Here the outer mold elements were removed and the molded boot, supported on the inner mold element, was subjected to warm dry air to permit it to "set." After the felt suspension had set, the molded felt boot, in accordance with the prior art practice, was subjected to hand finishing in a manner well understood in the art. This hand finishing, as mentioned above, is an expensive and time consuming operation. The finished felt boot in the prior art process was then subjected to further drying by warm air. When the drying was completed, the inner mold elements were removed from the boot, and the boot was ready for shipment.

In the practice of the present invention, and which will now be described in detail, the felt boots being molded are subjected to a pressing action while they are still in the mold. This pressing action precludes any necessity for hand finishing the molded article. In accordance with the present invention, after the pressing operation, the outer mold elements are opened, and the pressed and finished felt boot on the inner mold element is subjected to a drying warm air. Then, after any slight touching up operations that might be required, the inner mold element is removed in a manner to be explained, and the boot is ready for shipment.

As shown particularly in FIGURES 1, 2 and 3, the mold assembly of the present invention is supported on a rectangular platform 10. As noted above, this platform is releasably attached to an appropriate conveyor system, so that it (and the mold assembly supported by it) may be carried from one station to another as the molding process of the present invention is carried out.

A rectangular hole 12 is provided in the center of the platform 10. The inner mandrel mold element has a central longitudinal portion 14 with a stud member 16 formed integral therewith; the upper part of the stud member 16 also having a rectangular configuration. The stud 16 extends down through the rectangular hole 12 in the platform 10. The lower end of the stud 16 has a circular configuration and is threaded, and a nut 18 is threaded on the lower end of the stud 16 securely to support the central portion 14 of the inner mold element in an upright position on the platform 10. The rectangular configuration of the upper part of the stud 16, and the corresponding rectangular configuration of the hole 12, prevent rotation of the central portion 14 of the inner mold element with respect to the platform 10.

The platform 10 may be formed of any suitable hard metal, such as hard aluminum. It may, for example, be one inch thick, and as noted is adapted to be placed on a conveyor. It is contemplated that the conveyor be provided with corresponding conveyor plates to receive platforms, such as the platform 10, and that each platform will be securely screwed down on the corresponding plates of the conveyor.

The inner mandrel mold element is indicated generally as 18 in FIGURE 1. The inner mold element 18 has the general configuration of the interior of the boot to be molded. It includes the central portion 14 described above, and it also includes a rear portion 20 and a front portion 22. A toe portion 24 is mounted on the front portion 22 in a manner so that it may be detachable from the front portion.

As best shown in FIGURE 4, the central portion 14 of the inner mold element 18 is provided with a pair of elongated rectangular tongue members 26 and 28 which are secured to its opposite sides. As illustrated in FIGURE 4, the tongue member 28, for example, is secured to one side of the mold portion 14 by means of a pair of screws 30. However, if so desired, the tongue members 26 and 28 may be formed integral with the inner mold portion 14. The tongue members 26 and 28 may have a square section, for example, and may have a dimension of ¾″ x ¾″ x 14″. The tongue members 26 and 28 of the central portion 14 of the inner mold element extend into appropriate channels, or grooves, in the front mold portion 22 and rear mold portion 20 respectively. This tongue and groove construction permits the front and rear mold portions of the inner mold element to be slidably moved up and down with respect to the central mold portion 14, the latter mold portion being affixed to the platform 10, as described above.

Therefore, at the end of the molding operation, the resulting molded footwear may be moved upwardly, together with the front and rear portions 20 and 22 of the inner mold element 18, so that it can be removed from the platform 10. Then, the rear portion 20 can be removed from the boot, and the front portion 22 can also be removed. The front portion is removed, after the toe portion has been released, as will be explained.

A pair of locking members 32 are mounted on opposite sides of the elongated member 28 (FIGURE 4), and a corresponding pair of locking members are mounted on opposite sides of the elongated tongue member 26. Each of these locking members, as shown in FIGURE 5, is mounted in a cavity in the corresponding tongue member, and each includes a pivoted pin 34 which is spring-loaded by a spring 36 (FIGURE 5). The action is such that the end of the pin 34 is biased outwardly from the plane of the side of the corresponding elongated member 26 or 28, as shown in FIGURE 5. The upper end of each pin 34 has the illustrated configuration, and a lip in the corresponding cavity in the corresponding tongue member engages the upper end of the pin 34, as shown, to limit the outward movement of the pin.

When the rear and front portions 20 and 22 of the inner mandrel mold element are moved down adjacent the central portion 14, the spring-loaded pins 34 of the lockers 32 are depressed to permit a sliding action between the tongue members 26 and 28, and the corresponding channels in the respective rear and front portions 20 and 22. As shown in FIGURE 6, the channel in the rear portion 20 has a pair of cavities 38 formed in its walls, and each cavity 38 includes an upper pocket 40 (FIGURE 7). Similar cavities are formed in the walls of the channel in the front portion 22.

The cavities 38 are positioned to receive the spring-loaded pins 34 of the locking members 32 when the front and rear portions 22 and 20 of the inner mold element 18 are moved down in place beside the central portion 14. The pins 34 enter the corresponding pockets 40 to hold the front, rear and central portions of the inner mandrel mold tightly together. However, the arrangement is such that the rear and front portions 20 and 22 of the inner mold element 18 can be moved freely upwardly with respect to the central portion 14 without impediment by the locking members 32.

In a constructed embodiment of the invention, the inner mandrel mold element 18 was of the order of fourteen inches high, and the locking members 32 were positioned three inches from the top and from the bottom of the tongues central portion 14. As noted above, the width and length of the elongated tongue members 26 and 28 were three-quarters of an inch, and the channels in the rear and front portions 20 and 22 of the inner mold element 18 had similar dimensions.

As illustrated in FIGURE 1, the toe portion 24 of the inner mold element 18 is detachably mounted on the front portion 22 by means including a spring-loaded pin 50. The spring-loaded pin is coupled by any appropriate means to an actuating button 52 which is recessed in the front portion 22. The actuating button 52 is accessible only when the front portion is removed from the central mold portion 14. This permits the toe portion 24 to be released quickly and simply after the shoe has been removed from the platform 22, and merely by manually actuating the button 52. This enables the inner mandrel mold element 18 quickly to be disassembled and removed from the finished molded boot.

As best shown in FIGURES 8, 9, 10 and 11, the outer mold 61 is of a two-piece construction, and it includes a first outer mold element 60 having a boot-shaped cavity 62 (FIGURE 11) corresponding substantially to a first half of a boot to be molded in the mold; and the outer mold also includes a second outer mold element 64 having a boot-shaped cavity corresponding substantially to the second half of the boot to be molded. The outer mold may have a generally rectangular external configuration (FIGURES 8 and 11), and it may be formed of a suitable material, such as hard aluminum.

As shown in FIGURE 9, a marginal member 66 is secured to the first mold element 60 of the outer mold 61 and extends around its periphery for engagement with the peripheral surface of the second mold element 62 of the outer mold at the parting line between the two outer mold elements. This marginal member 66 is in the form of a knife edge, and the mating edge of the outer mold element 62 has a configuration to receive the knife edge 66 without producing irregularities in the inner molding surface of the outer mold at the parting line. The configuration of the knife edge 66, and the mating configuration of the edge of the outer mold element 62, permits the outer mold elements 60 and 62 to be moved towards one another from the position of FIGURES 9A and 9B to the position of FIGURE 9C in telescoping relationship to compress the substance in the mold.

The mold element 60 of the outer mold 61 is supported on the platform 10 by means of a stud 68 which extends downwardly from the element 60 into a slot in the platform 10. The upper portion of the stud 68 may have a rectangular configuration to engage the sides of the slot and prevent rotation of the mold element 60 with respect to the platform 10. The lower portion of the stud 68 may be circular and threaded to receive a wing-nut 70. The nut 70 may be tightened against the lower face of the platform 10, with insufficient force to prevent the telescoping movement of the outer mold element 60 toward the other outer mold element 62. The outer mold element 62 has a similar stud 72 extending downwardly from it through a second slot in the platform 10. The stud 72 also has a rectangular configuration at its upper end to prevent rotation of the outer mold element 64 on the platform 10. The lower end of the stud 72 is circular and threaded to receive a wing-nut 74. The wing-nut 74 may be tightened against the lower surface of the platform 10 with a force which is insufficient to permit movement of the outer mold element 64 across the platform.

The outer mold elements 60 and 64 are held together at the parting line of the mold by hooks, such as the hooks 76 in FIGURE 10A, and similar hooks at the other side of the mold. The hooks 76 are adapted to extend across the parting line between the outer mold elements 60 and 64, to extend through eye-members 78a and 78b mounted at the edges of the respective outer mold elements 60 and 64. The hooks 76 are composed of steel, for example, and they are originally latched with eyes 78b. Then when the outer mold elements 60 and 64 are moved together, the hooks are latched with the eyes 78a. In this manner, the hooks 76 serve to hold the outer mold elements 60 and 64 in firm registry with one another. To release the hook, a suitable lifter is provided which engages both sides of the hooks and enables them to be removed.

Instead of the hooks 76 of FIGURE 10A, a pair of eyes 78' (FIGURES 10B and 10C) may be used at each position. A first pin 79a is then inserted into each pair of eyes 78' when the outer mold elements are spaced apart. These first pins are removed when the mold is in the press, and they are replaced by pins, such as the pins 79b (FIGURE 10C) when the outer mold elements have been pressed together.

In using the apparatus of the invention, the central portion 14 of the inner mold element 18 is affixed to the platform 10. It should be pointed out that this portion may be a universal member, and that different rear and front portions 20 and 22, and different toe portions 24, can be used in conjunction therewith for different shapes and sizes of shoes and boots.

As a second step in the process of the invention, the rear and front portions 20 and 22, and the toe portion 24 of the inner mold element 18 are slipped into place, and locked in position by the locking members 32. The outer mold elements 60 and 64 are then placed in position, the hooks 76 are latched to the eyes 78b and the wing-nuts 70 and 74 tightened into place.

As shown in FIGURE 12, the molds are mounted on a conveyor 100 and carried thereby from one station to another. The illustrated conveyor and associated equipment are shown merely as illustrative of an example of suitable apparatus for carrying out the process of the invention. In actual practice it is contemplated that multiple fillers and multiple presses will be used.

As shown in FIGURE 12, the platforms 10, carrying successive molds 61 are placed on the conveyor 100 and are carried thereby from station to station. In the position A, a blowgun 102 from a pressurized source of material 104 is inserted in a filler hole 106 (FIGURES 8 and 11) in the outer mold element 60. The source 104 contains, for example, a slurry suspension of felt particles in a volatile solvent. The resulting slurry is blown through the blowgun 102 and into the hole 106. Suitable regulators are provided so that the desired pressure can be obtained, and so that an indication may be made as to when the mold is full. It may be pointed out that the pressure at which the felt slurry is introduced to the mold 61 can be varied during the filling of the mold to change the density at different portions of the boot to be molded. In this manner, a harder portion can be obtained at, for example, the heels and sole of the boot.

When the mold is completely filled at station A, the hole 106 is plugged with a flush plug, and the plug is locked in place. The conveyor now moves the filled mold to station B. At station B, a press is provided, as indicated 110. This press has pistons which engage the opposite sides of the outer mold 61, and serve to press these sides together. This movement of the sides is permitted by unlatching the hooks 76, by the slots in the platform 10, as described above, and by the telescopic arrangement of the outer mold elements due to the knife edge member 66. As noted above, after the pressing operation, the hooks 76 are latched in the eyes 78a, so that the outer mold elements 60 and 64 are held tightly together in the compressed position, after the pressing force of the press 110 has been removed.

When the aforementioned force has been removed, the mold moves on to station C which is located in a drying room. Suitable pressure and time indicators are provided in conjunction with the press 10 so that the desired time and pressure can be indicated for any particular boot. In this manner, the quality of any particular boot can be regulated to provide strong and tight boots, hard boots, soft boots, whichever is desired.

In the drying room, the boots are subject to warm dry air, so that they can be set. The station D is also located in the drying room, and at that station the outer mold 61 is removed, in the described manner. The boots on the inner mold 18 are then subjected to a final drying action, and any necessary touching up operations are then performed on the boots. However, it should be pointed out, that no hand finishing is required due to the pressing operation.

The mold assembly is then moved to the station E, at which the molded boot or shoe is removed from the platform 10, in the described manner, leaving only the central portion 14 of the inner mold element 18. The other portions of the inner mold element are then removed from the boot, as described above, and the boot is then ready for shipment. It will be noted that the process may continue on a substantially continuous basis, as the molds move from station to station.

The invention provides, therefore, an improved and simplified molding apparatus whereby molded footwear can be manufactured in a completely automatic manner and rapidly and inexpensively.

I claim:

1. In apparatus for making felt boots and which includes a carrier, the combination of: a supporting platform adapted to be detachably connected to the carrier; a two-piece outer mold element including a first outer mold element having a boot-shaped cavity corresponding substantially to a first half of a boot to be molded in the apparatus, and a second outer mold element having a boot-shaped cavity corresponding substantially to a second half of the boot; a marginal member secured to said first mold element for engagement with said second mold element to permit said first outer mold element and said second outer mold element to be moved towards one another in telescoping relationship, said marginal member including a knife blade mounted on said first molding element and extending around the periphery thereof, and said second molding element including a peripheral channel for receiving said knife blade; latching means for releasably holding said first outer mold element and said second outer mold element together in registering relationship; first attaching means for affixing said first and second outer mold elements to said supporting platform in a manner to permit said first and second mold elements to be moved back and forth with respect to one another; means positioned at the upper end of one of said mold elements for defining a filler inlet in the normal bottom of the boot to be molded in the apparatus; an inner mandrel mold element having a rear portion, a central portion, a front portion, and a laterally extending toe portion detachably mounted on said front portion, and which portions when in assembled relationship with respect to one another have an external surface corresponding to the interior of the boot to be molded; coupling means for coupling said rear and front portions of said inner mandrel mold elements to said central portion thereof to permit sliding motion between said portions; and second attaching means for affixing said central portion of said inner mandrel mold element to said supporting platform so as to position said inner mandrel mold element within said two-piece outer mold element, with the outer surface of said inner mandrel mold element being displaced from the inner surface of said two-piece outer mold element.

2. The combination defined in claim 1 in which said supporting platform has a pair of aligned slots formed therein, and said first attaching means includes respective studs extending downwardly from said first and second outer mold elements into respective one of said slots, and in which said second attaching means includes a rectangular stud extending downwardly from said central portion of said inner mandrel mold element into a rectangular aperture in said supporting platform to prevent rotation of said central portion of said inner mandrel mold element with respect to said supporting platform.

3. The combination defined in claim 1 and which includes a spring-loaded releasable latching means for detachably affixing said toe portion of said inner mandrel mold element to said front portion thereof, and a latch actuator coupled to said latching means and mounted on said front portion of said inner mandrel mold element.

4. The combination defined in claim 1 and in which said coupling means includes a pair of elongated tongue members secured to the opposite sides of said central portion of said inner mandrel mold element and entering into corresponding channels in said rear and front portions thereof, and at least one locking member mounted in each of said elongated members to inter-lock said rear and front portions of said inner mandrel mold element to said central portion thereof when said rear and front portions are moved down on said supporting platform adjacent said central portion, said locking members each including a spring-loaded pivoted pin adapted to engage a pocket in the corresponding channel of said rear and front portions of said inner mandrel mold element.

References Cited in the file of this patent

UNITED STATES PATENTS

| | | |
|---|---|---|
| 1,454,243 | McIndoe | May 8, 1923 |
| 1,479,266 | Trostel | Jan. 1, 1924 |
| 1,567,402 | Venn | Dec. 29, 1925 |
| 1,595,409 | Kerr | Aug. 10, 1926 |
| 2,000,042 | Sheppard | May 7, 1935 |
| 2,040,921 | Corlin | May 19, 1936 |
| 2,331,963 | Da Cunha | Oct. 19, 1943 |
| 2,470,089 | Booth | May 17, 1949 |
| 2,499,565 | Booth | Mar. 7, 1950 |
| 2,554,552 | Banovsky | May 29, 1951 |
| 3,016,574 | Fischer | Jan. 16, 1962 |

FOREIGN PATENTS

| | | |
|---|---|---|
| 1,080,648 | France | Dec. 10, 1954 |